US007347409B2

(12) United States Patent
Goza

(10) Patent No.: US 7,347,409 B2
(45) Date of Patent: Mar. 25, 2008

(54) ENGINE BLOCK LIFT

(76) Inventor: Tommy J. Goza, 5073 Kings Camp Rd., Acworth, GA (US) 30102

( * ) Notice: Subject to any disclaimer, the term of this patent is extended or adjusted under 35 U.S.C. 154(b) by 0 days.

(21) Appl. No.: 11/550,969

(22) Filed: Oct. 19, 2006

(65) Prior Publication Data

US 2007/0164263 A1 Jul. 19, 2007

Related U.S. Application Data

(60) Provisional application No. 60/759,867, filed on Jan. 18, 2006.

(51) Int. Cl.
*B66B 3/00* (2006.01)
*B60P 1/48* (2006.01)

(52) U.S. Cl. ................ 254/2 B; 254/10 B; 254/133 R; 269/17

(58) Field of Classification Search ................ 254/2 B, 254/133 R, 10 B, 89 H, 93 R, 8 C, 87; 269/17
See application file for complete search history.

(56) References Cited

U.S. PATENT DOCUMENTS

| | | | | | |
|---|---|---|---|---|---|
| 1,812,585 | A | * | 6/1931 | Collins | 269/59 |
| 4,123,038 | A | * | 10/1978 | Meyers | 254/2 R |
| 4,479,632 | A | * | 10/1984 | McIntire et al. | 254/3 B |
| 4,486,004 | A | * | 12/1984 | Drewitz et al. | 254/2 B |
| 4,533,127 | A | * | 8/1985 | Hawkins | 269/17 |
| 4,705,264 | A | * | 11/1987 | Hawkins et al. | 269/17 |
| 5,141,211 | A | * | 8/1992 | Adams, Jr. | 269/16 |
| 5,505,578 | A | * | 4/1996 | Fuller | 414/427 |
| 5,779,225 | A | * | 7/1998 | Trost | 254/133 R |
| 5,851,007 | A | * | 12/1998 | Swartzlander et al. | 269/17 |
| 5,975,495 | A | * | 11/1999 | Berends et al. | 254/2 B |
| 6,457,700 | B1 | * | 10/2002 | Hong | 254/8 B |
| 7,137,615 | B2 | * | 11/2006 | Ray et al. | 254/10 B |
| 2005/0218384 | A1 | * | 10/2005 | Hernandez et al. | 254/10 B |

* cited by examiner

Primary Examiner—Lee D Wilson
(74) *Attorney, Agent, or Firm*—Gardner Groff Greenwald & Villanueva, PC

(57) ABSTRACT

An engine block lift for raising, lowering and supporting an engine block includes a movable frame that has ground-engaging wheels and an elongate base that extends laterally. A support shelf is provided for supporting an engine block and includes a non-marring surface upon which the engine block can rest. A tool tray is positioned near the support shelf and an air cylinder is coupled to the movable frame for raising and lowering the support shelf. A second tool tray is provided, as is a tool holster for supporting and storing a bar-like tool. The elongate base comprises a pair of low-profile elongate base legs for slipping beneath the frame of a mobile engine stand (when used in conjunction with a mobile engine stand).

13 Claims, 3 Drawing Sheets

ENGINE BLOCK LIFT

CROSS REFERENCE TO RELATED APPLICATION

The benefit of the filing date of U.S. provisional patent application Ser. No. 60/759,867, filed Jan. 18, 2006, entitled ENGINE LIFT, is hereby claimed, and the specification thereof is incorporated herein by this reference.

FIELD OF THE INVENTION

The present invention relates generally to tools and in particular relates to a tool used in the servicing and/or rebuilding of automotive engines.

BACKGROUND OF THE INVENTION

In servicing automotive engines, such as when rebuilding the engine, it is often necessary to raise or lower the engine block. Also, it often occurs that the engine block needs to be moved about as well. This raising and lowering of the engine block or moving the engine block about occurs in automotive machine shops, automotive garages, and in home garages.

Unfortunately, the engine block in most automobiles is quite heavy. Indeed, even the engine "block" can weigh more than 200 pounds. The engine block is the basic structure of the engine and houses the crankshaft, connecting rods, pistons, etc. Due to this substantial weight, it often takes two or more people to lift or lower an engine block. Additionally, for doing certain types of service operations on the engine block or when assembling the engine during rebuilding, the engine block typically is bolted to an engine stand to hold the engine at a comfortable working height of a few feet off the ground. Typical engine stands have a T-shaped base movably supported upon the ground by casters (wheels), an upright post, a tubular axle mounted to the post for pivotal movement, and a bolt plate welded to one end of the axle and adapted to be bolted to an engine block. It can take two or three people to lift the engine block and support it while bolting it to the engine stand.

Accordingly, it can be seen that there is yet a need in the art for a device for raising and lowering engine blocks and for supporting engine blocks. There is also a need for a device that can assist in attaching an engine block to an engine stand. It is to the provision of such a device that the present invention is primarily directed.

SUMMARY OF THE INVENTION

Briefly described, in a first preferred form the present invention comprises an engine block lift for raising, lowering and supporting an engine block. The engine block lift includes a movable base or frame that includes ground-engaging wheels and an elongate base that extends laterally. A support shelf is provided for supporting an engine block and includes at least one non-marring surface upon which the engine block can rest. A tool tray is positioned near the support shelf and an air cylinder is coupled to the movable frame for raising and lowering the support shelf.

Preferably, the at least one non-marring surface comprises a pair of plastic strips upon which the engine block rests. Preferably, the engine block lift includes a second tool tray, and more preferably the engine block lift includes a tool holster for supporting and storing a bar-like tool. It is preferred that the elongate base comprises a pair of low-profile elongate base legs for slipping beneath the frame of a mobile engine stand (when used in conjunction with a mobile engine stand).

Defined another way, the present invention comprises a lift for raising, lowering and supporting an engine block. The engine block lift includes a mobile frame including ground-engaging wheels and elongate base legs extending laterally. A support shelf is provided for supporting an engine block and includes a non-marring surface upon which the engine block rests. A lifting mechanism is coupled to the base for raising and lowering the support shelf. Furthermore, the engine block lift is adapted to be used in conjunction with a mobile engine stand of the type having a base frame supported above the ground by wheels. The elongate base legs of the engine block lift are made to be low-profile so as to be able to slip beneath the base frame of the engine stand. Advantageously, this allows the engine block lift to be used to lift an engine block up to the appropriate height for mounting to the engine stand, and rolled into cooperation with the engine stand, with the elongate base legs of the engine block lift slipping beneath the frame of the engine stand so as to allow the two structures to come together enough to allow the engine block being supported upon the engine block lift to be transferred to the engine stand and vice-versa.

Preferably, the lift mechanism comprises an air cylinder. Also preferably, one or more tool trays are positioned near the support shelf. Also preferably, a tool holster is provided for storing a bar-like tool. Moreover, preferably the support shelf includes a wheel for engaging the ground when the support shelf is lowered.

Defined yet another way, the present invention comprises a lift for raising, lowering, and supporting an engine block. The engine block lift includes a mobile frame including ground-engaging wheels and base legs extending laterally. A support shelf is provided for supporting an engine block and includes at least one non-marring surface upon which the engine block can rest. A lift mechanism is coupled to the frame for raising and lowering the engine block support shelf.

Each of the forms of the invention described above has the important advantage of allowing a single user to raise, lower, and support an engine block. The invention turns what otherwise is a two or three-person job into a one-person job. This improves safety and lowers costs. The invention also can be configured to advantageously provide various tools and parts in a handy location, using the tool trays and tool holster optional features. Also, the present invention simplifies the task of transferring an engine block to or from an engine stand and reduces danger associated with the transfer.

BRIEF DESCRIPTION OF THE DRAWING FIGURES.

DETAILED DESCRIPTION OF THE PREFERRED EMBODIMENTS

Figure 1:
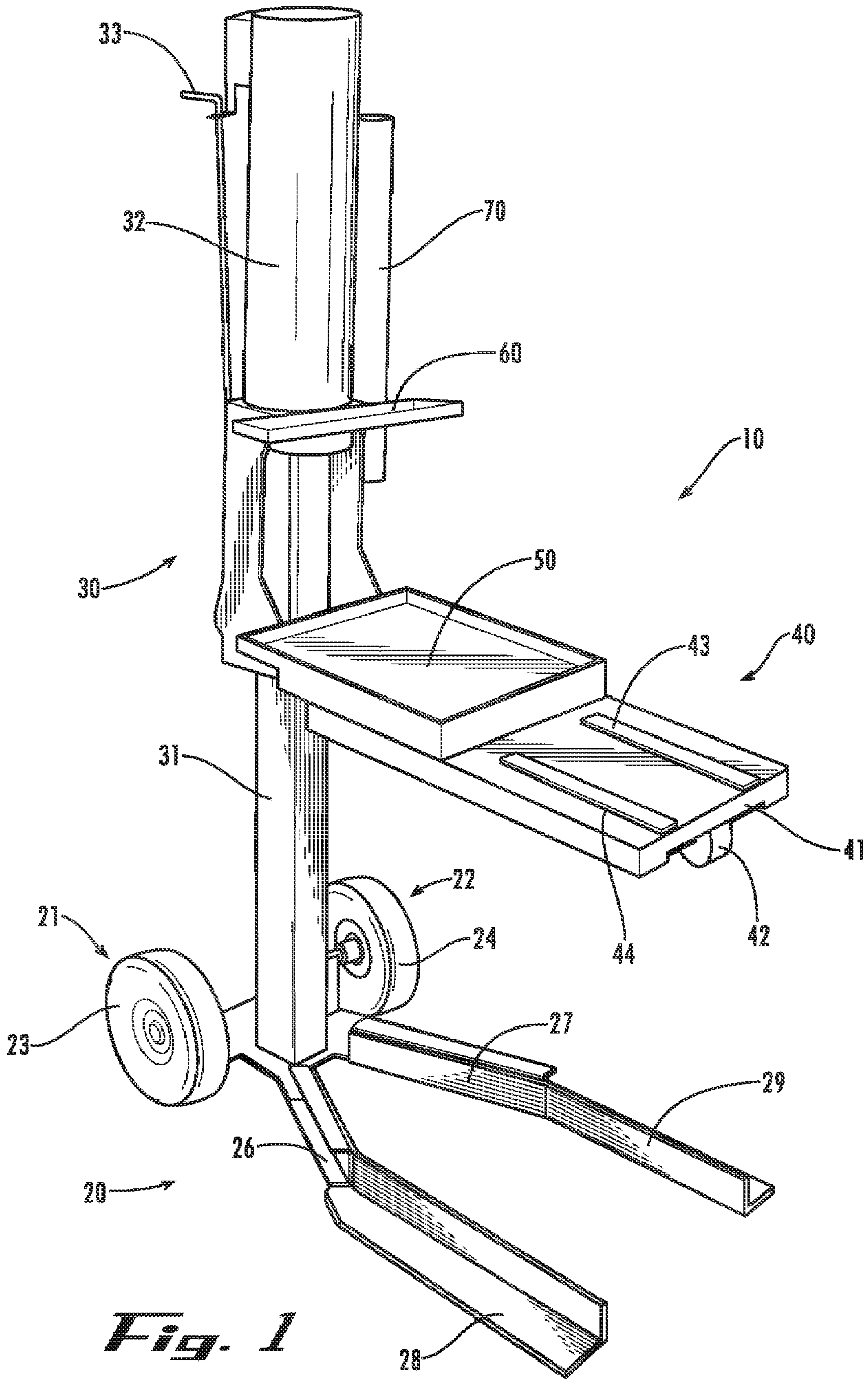
FIG. 1 is a perspective illustration of an engine block lift according to a preferred form of the present invention.

Referring now in detail to the drawing figures, wherein like reference numerals represent like parts throughout the several views, FIG. 1 shows an engine block lift 10 according to a preferred form of the invention. It will be understood by those skilled in the art that the engine block lift 10 can be used to lift engine blocks. The engine block lift 10 includes a base frame 20 having a pair of wheels indicated at 21 and 22. The wheels have rubber tires 23, 24. The base 20 also includes a laterally extending base, here shown in the form of legs comprising first and second extensions or proximal leg portions 26 and 27, which together form a sort of yoke in that the proximal leg portions 26 and 27 are splayed apart. The legs also include end portions or extensions 28 and 29 which extend parallel to one another and at an angle relative to the first (proximal) portions 26 and 27. In a commercial embodiment, these end portions comprise sections of angle iron, preferably having a width of 3.5 inches and a height of 2.5 inches. The end portions 28, 29 preferably are 20 inches long and they are about 14 inches apart (measured across from one to the other they cover about 21.5 inches). Those skilled in the art will recognize that these dimensions can be varied.

The lift 10 also includes a lifting mechanism indicated generally at 30. In the illustrative embodiment depicted in the drawing figures, the lifting mechanism 30 comprises an air cylinder. Air cylinder 30 includes a lower portion 31 welded to the base frame 20 and an upper, movable portion 32. An inlet coupling 33 is provided for attachment to a source of compressed air to allow the air cylinder to be operated. To raise the cylinder, pressurized air is brought in through the inlet coupling 33, while to lower the cylinder, air pressure is bled off. Those skilled in the art will recognize that other lifting mechanisms can be employed as desired. For example, a hydraulic cylinder could be used. Alternatively, an electric screw jack could be used.

A support shelf generally indicated at 40 is welded to the upper portion 32 of the air cylinder 30 for riding up and down with the upper portion of the air cylinder. In this way, as the air cylinder is operated, the support shelf can be raised or lowered as well. The support shelf 40 includes a platform 41, a caster or ground-engaging wheel 42 mounted beneath the platform 41, and a pair of plastic, non-marring strips 43 and 44 extending along the platform 41. The platform 41 is longer than it is wide and provides a good, stable support for an engine block to be rested thereupon. In this regard, the non-marring plastic strips 43 and 44 protect the engine block from damage. Preferably, the non-marring plastic strips are mounted in such a way as to be easily replaced when damaged or worn.

A tool tray 50 is mounted near the support shelf 40 for providing ready and convenient storage of tools and small parts for working on the engine block. A second tool tray 60 is also positioned generally nearby, as shown in the figure, a little above the first tool tray 50 and mounted to the upper portion 32 of the air cylinder 30. A holster 70 is provided for receiving an elongate, rod-like tool, as are often employed in removing or installing bearings, seals, and plugs in engine blocks. These trays and the holster are particularly handy and convenient.

Figure 2:
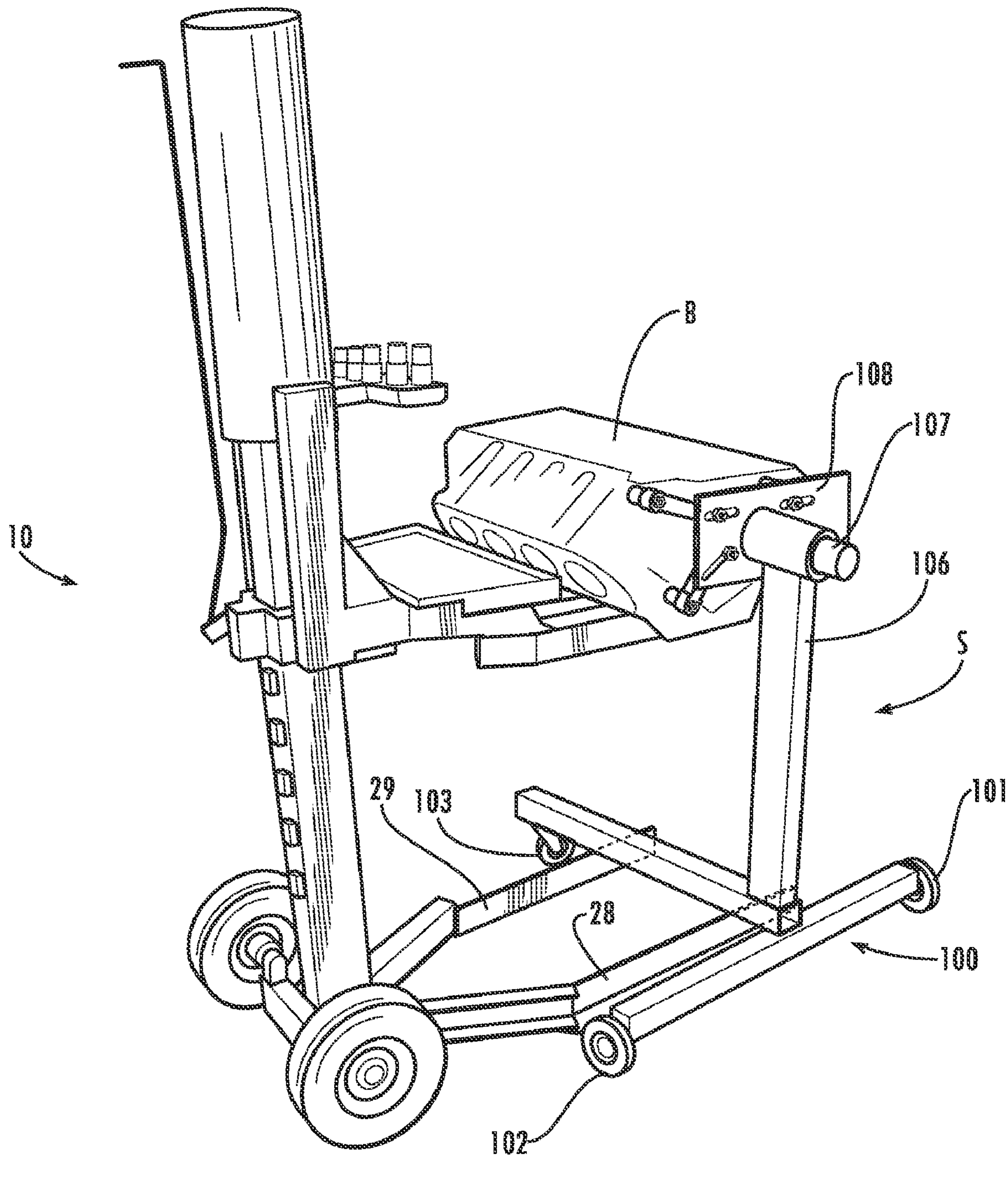
FIG. 2 is a perspective illustration of the engine block lift of FIG. 1, shown in conjunction with mobile engine stand (the mobile engine stand is shown with an engine bolted thereto).

Referring now to FIG. 2, the engine block lift 10 is shown in conjunction with mobile engine stand S having an engine block B to be mounted thereon. As shown in this figure, the engine block B is resting on the support shelf of the engine block lift 10 and is being maneuvered into a position to be mounted (bolted) to the engine stand S. The engine stand S depicted in this figure is a typical engine stand as are ubiquitously available, and has a T-shaped base 100 movably supported upon the ground by casters (wheels) 101-103, an upright post 106, a tubular axle 107 mounted to the post for pivotal movement, and a bolt plate 108 welded to one end of the axle and adapted to be bolted to an engine block. As shown in FIG. 2, the legs, including leg portions 28 and 29, of the engine block lift 10 can slip beneath the T-shaped base 100 of the engine stand S to facilitate this transfer of the engine block B from the engine block lift 10 to the engine stand S.

Figure 3:
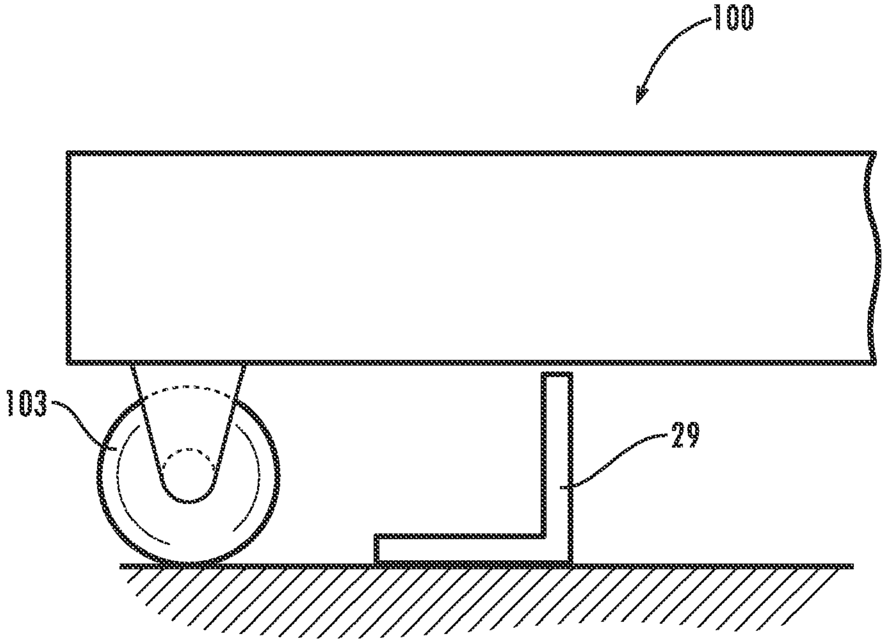
FIG. 3 is a schematic illustration of a portion of the engine block lift of FIG. 2, shown with said portion slipped beneath a portion of the engine stand of FIG. 2.

FIG. 3 shows in greater detail this relationship between the legs of the base portion of the engine block lift 10 and the T-shaped base frame of the engine stand S. As shown in FIG. 3, the L-shaped (preferably angle iron) distal leg portions, such as leg portion 29, are short enough to fit beneath the T-shaped base 100 of the engine stand S.

Figure 4:
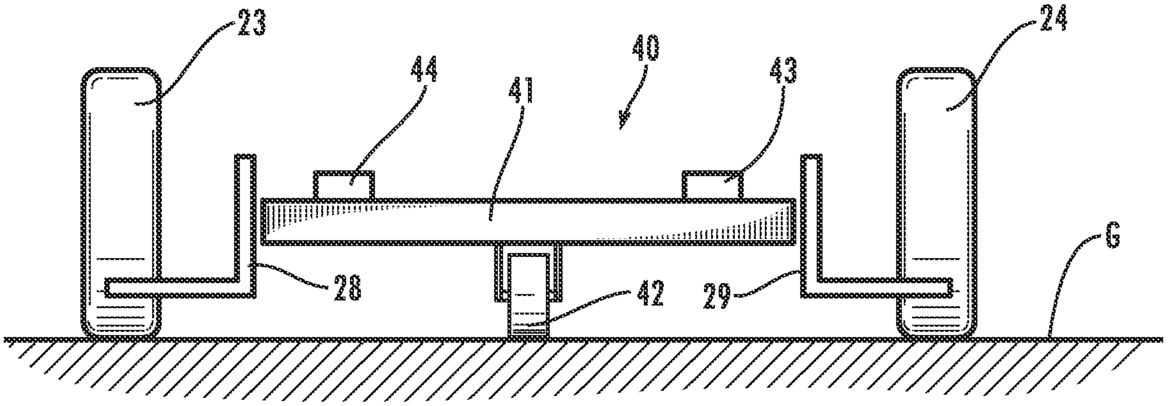
FIG. 4 is a schematic, front view of a portion of the engine block lift of FIG. 1.

FIG. 4 shows a portion of the engine block lift 10, depicting the platform 40 in a lowered position. In this lowered position, the caster 42 engages the ground G. Along with the rubber tires 23 and 24, the caster 42 helps to provide stable mobility for the lift 10.

Thus, as seen in the figures, the user simply lays the engine block B over the platform 41 of the engine block lift 10 when the platform 41 is in its lowered position. The lowered position permits the user to easily load or unload the engine block B. The engine block lift 10 can then be easily rolled to the desired work area. To raise the platform 41, the user can connect a source of compressed air, such as via an air hose, to the inlet coupling 33 and thus lift the platform to the desired work height. Once the platform 41 is raised to the desired height, the user can then manipulate the engine block B such as by installing freeze plugs and galley plugs. The engine block lift 10 may optionally have a block leveler which allows the user to pour the engine block B, such as one used for racing, with concrete. The user can also mount the engine block B on the engine stand S. Thus, the engine block lift 10 permits a single user to lift, move, and manipulate the engine block B.

It should be noted that the engine block lift 10 rolls only when the platform 41 is in a lowered position. Thus, the engine block lift 10 is very stable in all lifted positions.

While the invention has been disclosed in preferred forms, those skilled in the art will recognize that many modifications, additions, and deletions can be made therein without departing from the scope and spirit of the invention as set forth in the following claims.

The invention claimed is:

1. An engine block lift for raising, lowering, and supporting an automotive engine block, the engine block lift being for use in conjunction with a mobile engine stand of the type having a base frame supported above the ground by wheels, the engine block lift comprising:

a movable frame including ground-engaging wheels and an elongate base extending laterally;

a support shelf for supporting an engine block thereon and including at least one non-marring surface upon which the engine block can rest; and a lifting mechanism coupled to the frame for raising and lowering the support shelf; and wherein when the engine block lift is to be used in conjunction with the mobile engine stand of the type having a base frame supported above the ground by wheels, the elongate base of the engine block lift is low-profile so as to be able to slip beneath the base frame of the mobile engine stand to allow the engine block to be transferred between the engine block lift and the engine stand; and wherein the support shelf includes a wheel for engaging the ground when the support shelf is lowered, and wherein with the support shelf lifted the engine block lift is fixed in place and with the support shelf lowered to engage its wheel against the ground the engine block lift is made mobile.

2. An engine block lift as claimed in claim 1 wherein the lift mechanism comprises an air cylinder.

3. An engine block lift as claimed in claim 1 wherein the non-marring surface comprises plastic strips.

4. An engine block lift as claimed in claim 1 further comprising a tool tray positioned near the support shelf.

5. An engine block lift as claimed in claim 4 further comprising a second tool tray.

6. An engine block lift as claimed in claim 1 further comprising a tool holster for storing a bar-like tool.

7. An engine block lift for raising, lowering, and supporting an automotive engine block, the engine block lift comprising:

a movable frame including a pair of ground-engaging wheels and an elongate base extending laterally and wherein distal ends of the elongate base are free of any ground-engaging wheels;

a support shelf for supporting an engine block thereon and including at least one non-marring surface upon which the engine block can rest, wherein the support shelf includes a wheel for engaging the ground when the support shelf is lowered; and a lifting mechanism coupled to the frame for raising and lowering the support shelf;

wherein the engine block lift is adapted to be used in conjunction with a mobile engine stand of the type having a base frame supported above the ground by wheels and wherein the distal ends of the elongate base of the engine block lift being free of ground-engaging wheels are low-profile so as to be able to slip beneath the base frame of the mobile engine stand.

8. An engine block lift as claimed in claim 7 wherein the lift mechanism comprises an air cylinder.

9. An engine block lift as claimed in claim 7 wherein the non-marring surface comprises plastic.

10. An engine block lift as claimed in claim 9 wherein the non-marring surface comprises two elongate plastic strips.

11. An engine block lift as claimed in claim 7 further comprising a tool tray positioned near the support shelf.

12. An engine block lift as claimed in claim 11 further comprising a second tool tray.

13. An engine block lift as claimed in claim 7 further comprising a tool holster for storing a bar-shaped tool.

* * * * *